Aug. 16, 1932.  F. H. LE JEUNE  1,872,150
TIRE CARRIER
Filed May 27, 1929   2 Sheets-Sheet 1
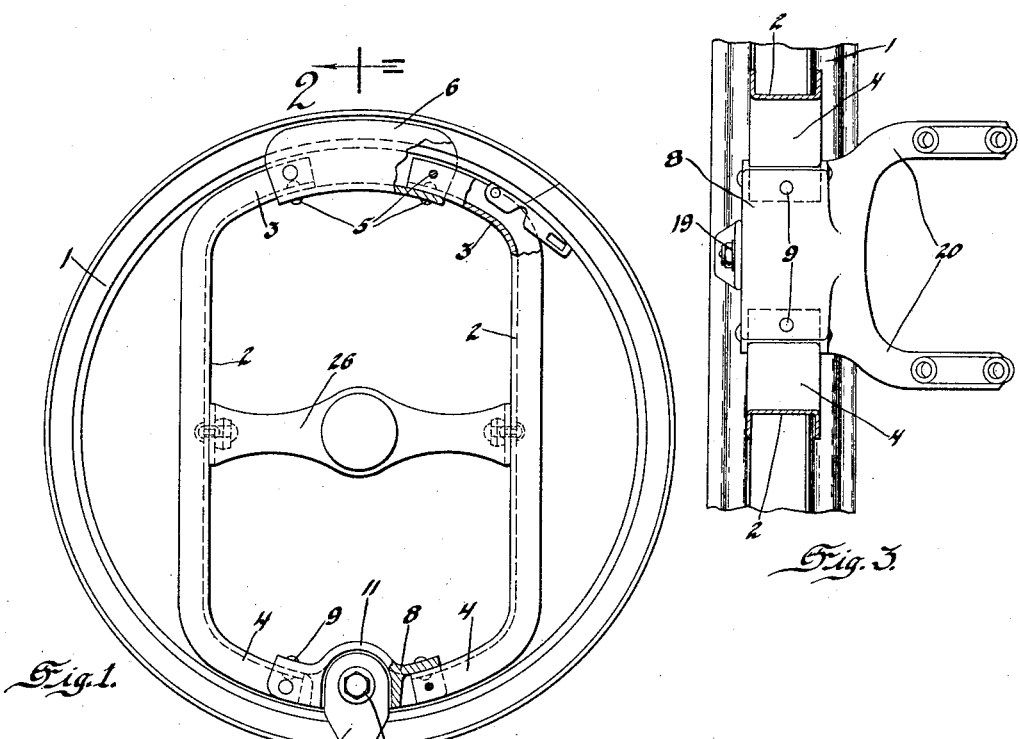
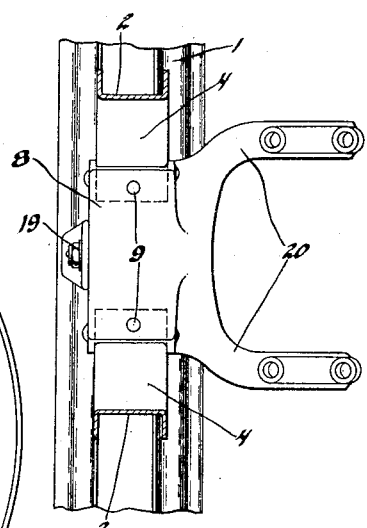
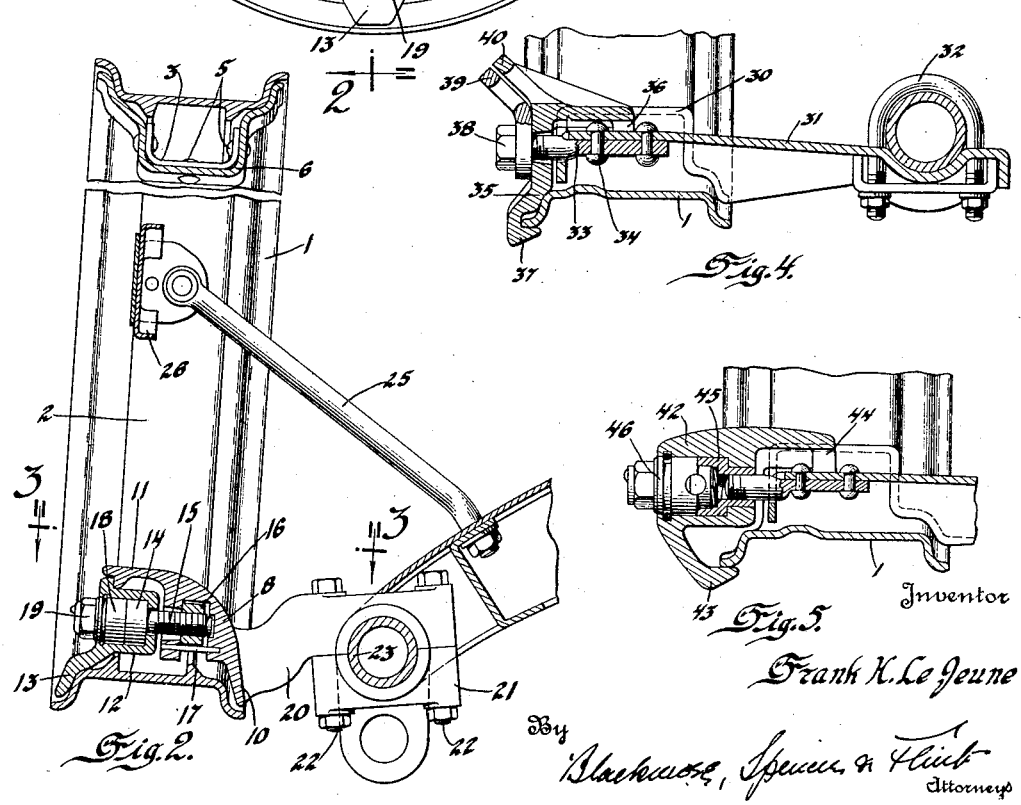
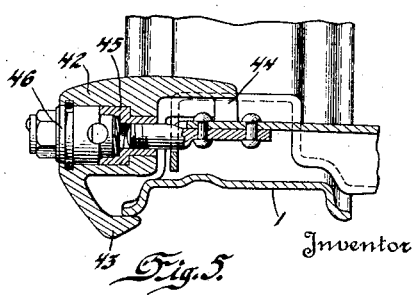
Inventor
Frank H. Le Jeune
By Blackmore, Spencer & Flint
Attorneys

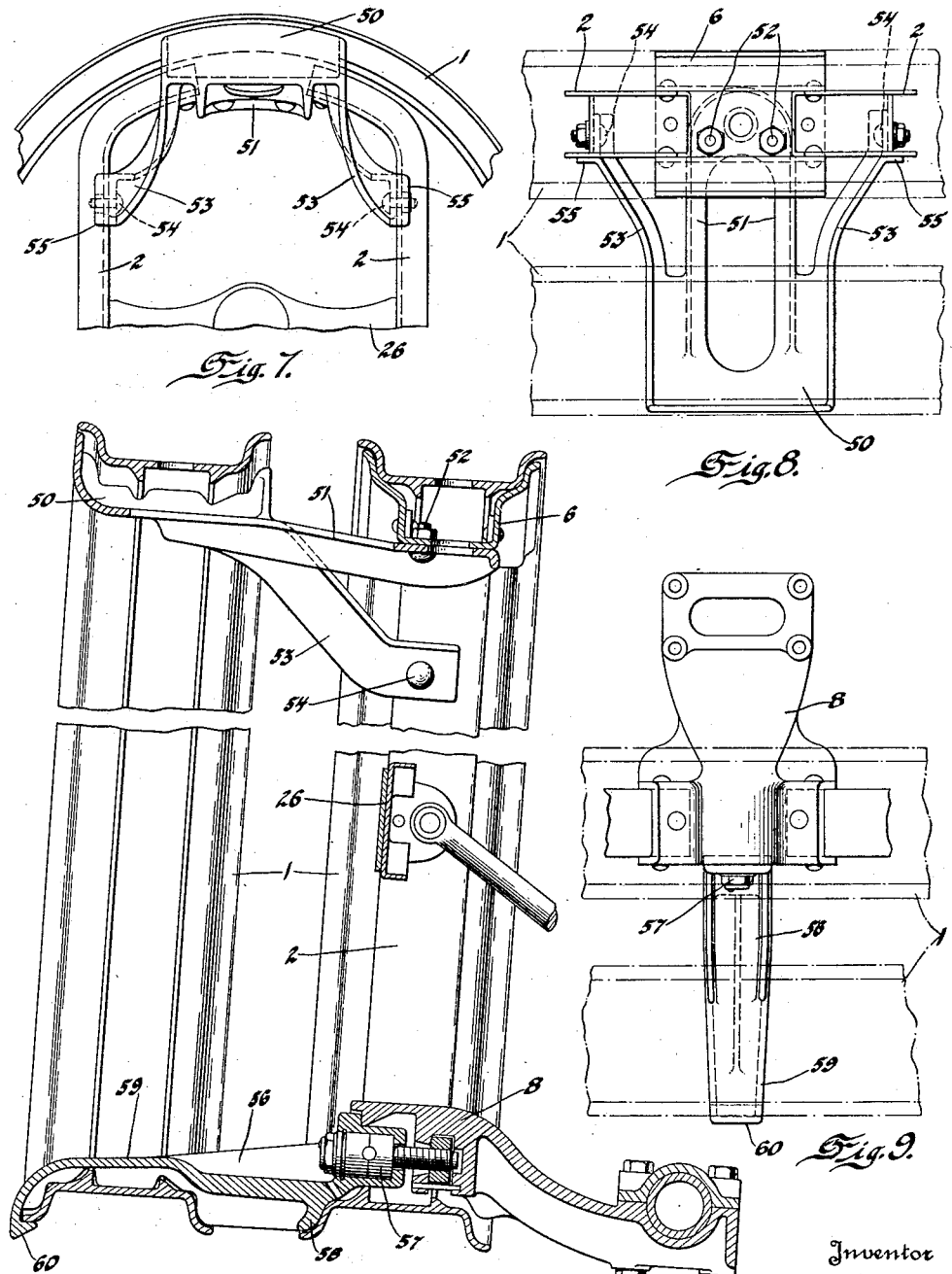

Patented Aug. 16, 1932

1,872,150

UNITED STATES PATENT OFFICE

FRANK H. LE JEUNE, OF JACKSON, MICHIGAN, ASSIGNOR TO GENERAL MOTORS CORPORATION, OF DETROIT, MICHIGAN, A CORPORATION OF DELAWARE

TIRE CARRIER

Application filed May 27, 1929. Serial No. 366,366.

This invention relates to tire carriers for motor vehicles and contemplates the provision of a frame which may be conveniently mounted at the rear of the vehicle to receive extra or spare tires.

It is among the objects of the invention to provide an improved tire carrier which will be rugged in construction and comprise but a few simple and easily assembled parts, so as to be economical in manufacture, and which furthermore will be of distinctive and pleasing appearance and lend a certain ornamental effect to the rear of the car on which it is used.

A further object of the invention is to provide a carrier which will minimize and preclude the likelihood of theft or unauthorized removal of spare tires.

Another object is to provide an improved arrangement for carrying two spare tires on the same main frame.

Still other objects and advantages will become apparent during the course of the following specification, when taken in connection with the accompanying drawings, wherein:

Figure 1 is an elevation of the tire carrier forming the present subject matter, with parts thereof shown in section;

Figure 2 is a vertical sectional view and is taken on line 2—2 of Figure 1;

Figure 3 is a transverse sectional view taken on line 3—3 of Figure 2;

Figure 4 is a vertical section of a lower portion of a tire carrier and illustrates a modification;

Figure 5 is a vertical sectional view showing an alternative construction of the lower portion of the tire carrier;

Figure 6 is a vertical sectional view of the tire carrier provided with auxiliary or extension brackets for carrying a second spare tire;

Figure 7 is a fragmentary elevation of a portion of the construction shown in Figure 6; and Figures 8 and 9 are top plan views, respectively, of the upper and lower extension brackets.

Referring now to the drawings, the reference character 1 indicates a spare tire rim or rims to be mounted on the carrier. In the present instance, the carrier is shown as consisting of an oblong frame having a pair of substantially straight and parallel side bars extending in a vertical direction and a pair of arcuate end portions, the arcs of which conform to the inner periphery of the rim 1. This frame is preferably made up in part of a pair of oppositely disposed U-shaped members, channeled in cross section, with the channel opening outwardly, to provide a pair of side flanges which serve to materially stiffen and reenforce the structure. For economy and convenience of manufacture, these U-shaped members may be substantial duplicates and comprise the straight side bars 2 and top and bottom angularly extending arcuate legs 3 and 4 respectively. The adjacent ends of the upper legs 3—3 are shown as being nested in and secured by rivets 5 to a channeled bridge piece or saddle 6 of arcuate shape, to correspond with the arcs of the legs 3—3, and form therewith the end portions of the oblong frame. As illustrated in Figure 2, the side flanges of the channeled bridge piece or saddle 6 extend beyond the side flanges of the legs 3 and preferably flare outwardly to provide seats for receiving an upper portion of the rim 1 therebetween. An arcuate bridge piece or saddle 8 is secured by rivets 9 to the adjacent ends of the lower legs 4. This saddle 8 is also of channel shape in cross section to receive the legs 4, but the rearmost flange thereof terminates at or adjacent the peripheral edge of the corresponding flange of each leg, while the forward flange extends downwardly as at 10 in Figure 2 to form a seat for the forward side of the tire rim. At a central point the saddle 8 may be arched upwardly as at 11 to form a hollow housing that receives a cylindrical extension 12 of the rim retainer lug 13. Within the extension 12 is located the head 14 of an attachment stud 15 adapted for screw threaded engagement with a nut 16 secured within an opening or notch in the portion 11, as by the retainer pin 17. Also positioned within the extension 12 and over the head 14 is a lock barrel or casing 18 secured for free rotation in the extension by a pin projecting into an annular groove in the barrel. Suitable lock mechanism in the barrel 18 controls a retractable plunger or key (not shown) that is engageable with the head 14 to rotate the stud with the barrel upon the application of a suitable tool to the polygonal head 19 forming a part of the barrel and located outside the lug. As will be readily understood, the lock controlled plunger is moved into or out of engagement with the head 14 upon manipulation of a proper key inserted axially of the barrel through the head 19, and that at such times as when the plunger is retracted any rotation of the barrel will not in any way affect the adjustment of the attachment stud 15, whereby the tire is securely seated at substantially diametrically opposite points on the frame and held against unauthorized or surreptitious removal by the locked retaining lug 13.

Preferably formed or cast integral with the lower saddle 8 are a pair of forwardly extending forks or attachment brackets 20 which may be secured by retainer caps 21 and fastening bolts 22 to a transversely extending frame member 23 at the rear of the chassis. In addition to the integral attachment brackets of the member 8, there may be provided a pair of upwardly and rearwardly extending brace bars, one of which is shown at 25, connected at opposite ends to the chassis frame and a side bar 2 of the carrier frame at an intermediate point in the height of the bar. Also located at an intermediate portion of the frame is a transverse bar 26 preferably of an ornamental outline and formed of a sheet metal stamping, and which is secured at its opposite ends, as by riveting, welding or the like, to the respective side bars 2. This bar 26 serves to break up the large open space in the center of the frame and enhance the decorative appearance of the carrier. It furthermore ties the two bars together and affords a certain amount of reenforcement and stiffness to the frame and resists collapse or distortion under such force as may be applied by a pry bar or the like in the hands of vandals.

In lieu of forming the lower bridge piece of cast metal, it may be stamped from sheet metal as indicated at 30 in Figure 4. In this case the forward attachment bracket 31 is secured to the transverse frame member by a U clip or bolt 32. A fastening stud or screw 33 is shown as being secured by rivets 34 on the under side of the member 30 and projected through an aperture in the front flange to carry a retainer lug 35 of angular shape in cross section. One leg of the lug 35 is provided with fulcrum portions 36 for rocking and sliding contact with the upper side of the saddle 30, and the other leg terminates in a hook 37 that engages over the rearmost flange of the tire rim to prevent the lug from being twisted upwardly. Threaded on the outer end of the stud 33 is a fastening nut 38 having an apertured diagonal ear 39, the aperture in which may be brought into alignment with a corresponding aperture in the diagonal ear 40 formed on the retainer lug to permit the insertion therethrough of the hasp of a padlock.

If desired, the combined retainer lug and lock 42 shown in Figure 5 may be employed. This unit has a hook portion 43 for engagement over the tire rim flange and a fulcrum portion 44 for engagement with the upper side of the sheet metal saddle, and embodies also a nut 45 threaded on the attachment stud and controlled by suitable lock mechanism enclosed within the barrel 46 in the manner before referred to.

In the event the car owner wishes to carry two spare tires, the oblong frame may be provided with upper and lower extension brackets as shown in Figures 6 to 9. The upper bracket includes a rim engaging outer portion 50, a central and forwardly extending leg 51 secured as by means of rivets or bolts 52 on the under side of the upper arcuate end portion of the frame, and a pair of downwardly and outwardly flaring arms 53 fastened by bolts 54 to the side bars 2 of the main frame. The legs 53 may be provided with lateral flanges 55 for engagement with the forward flanges of the bars 2—2, as shown best in Figure 8. The lower extension bracket 56 may be secured by the lock controlled stud 57 to the bottom saddle 8, and is provided with a retainer flange 58 for engagement with the rim on the main frame, and with a seat portion 59 at its outer end for engagement with the second spare tire. As a precautions against the forcing of the bracket 56 upwardly, its outer end may terminate in a hook 60 for engagement with the adjacent flange of the extra spare tire rim.

While the above description has been more or less specific, it will, of course, be understood that there is no intention to limit the invention to the exact details referred to. The structure is capable of such modifications as come within the scope of the following claims.

I claim:

1. An oblong frame for carrying an annular tire, comprising a pair of spaced side members, each having an intermediate straight portion and laterally projecting legs of arcuate formation at opposite ends with corresponding legs of said members extending toward each other and ending in spaced relation, and bridge pieces extending across the space between and connecting the arcuate legs at corresponding ends of said side members and cooperating therewith in forming the end portions of the frame on which the tire may be seated.

2. The structure of claim 1 in which the bridge pieces are formed on arcs to coincide with the arcuate legs and at least one of which is of channel shape in cross section to receive the tire.

3. An oblong frame for carrying an annular tire, comprising a pair of spaced substantially straight and parallel side bars, an arcuate end portion of channel shape in cross section to receive the tire, connecting adjacent ends of the two side bars, an arcuate end portion connecting the other adjacent ends of the bars, and having a tire engaging flange at one side thereof, said connected side bars and end portions cooperating to afford a rigid unit, and a lug removably secured at the other side of said latter end portion for cooperation with said flange in detachably securing an applied tire.

4. The structure of claim 3, wherein the lug is of angle section and is provided at one end with a hook to engage over a side flange of a tire rim and at its other end with a fulcrum portion for engagement with the back of the adjacent end portion.

5. An oblong frame for carrying an annular tire comprising a pair of spaced substantially straight and parallel side bars and a pair of arcuate end portions providing seats for the tire, and an auxiliary bracket having a seat for a second tire, and including a central leg for attachment to an end portion of the frame and a pair of downwardly and outwardly flaring legs for attachment with the respective side bars.

6. Means to carry two spare tires including an oblong frame having a pair of spaced side bars and arcuate end portions on which the first tire is mounted and a bracket for carrying the second tire having a centrally extending leg for attachment with an end portion of the frame and a pair of outwardly and downwardly extending legs for attachment with the side bars.

7. An auxiliary tire carrying bracket for attachment to an oblong tire carrying main frame, including a tire receiving portion, a central leg extended forwardly and adapted for attachment with an end portion of the oblong main frame, and a pair of downwardly and outwardly flaring legs adapted for attachment with the side bars of the oblong frame.

In testimony whereof I affix my signature.

FRANK H. LE JEUNE.